(12) United States Patent
Tsingas

(10) Patent No.: US 10,371,839 B2
(45) Date of Patent: Aug. 6, 2019

(54) BLENDED LAND SEISMIC DATA ACQUISITION EMPLOYING DISPERSED SOURCE ARRAYS WITH VARIABLE SWEEP LENGTH

(71) Applicant: Saudi Arabian Oil Company, Dhahran (SA)

(72) Inventor: Constantinos Tsingas, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 322 days.

(21) Appl. No.: 13/910,274

(22) Filed: Jun. 5, 2013

(65) Prior Publication Data

US 2014/0362659 A1    Dec. 11, 2014

(51) Int. Cl.
    *G01V 1/00*        (2006.01)
(52) U.S. Cl.
    CPC .................... *G01V 1/005* (2013.01)
(58) Field of Classification Search
    CPC ......... G01V 11/007; G01V 2210/6163; G01V 3/12; G01V 1/30; G01V 11/00; G01V 1/003; G01V 1/008; G01V 1/28; G01V 3/16; G01V 3/38; G01V 1/282; G01V 1/38; G01V 3/082; G01V 1/02
    USPC .......................................................... 367/14
    See application file for complete search history.

(56) References Cited

U.S. PATENT DOCUMENTS

| 3,923,121 A | * | 12/1975 | Kruppenbach | G01V 1/201 181/108 |
|---|---|---|---|---|
| 5,668,342 A | * | 9/1997 | Discher | F42B 33/06 102/293 |
| 6,545,944 B2 | | 4/2003 | de Kok | |
| 7,602,670 B2 | | 10/2009 | Jeffryes | |

(Continued)

OTHER PUBLICATIONS

Bagaini, "Overview of Efficient Vibroseis Acquisition Methods", EAGE 68th Conference & Exhibition Vienna, Austria Jun. 12-15, 2006, pp. 1-5, European Association of Geoscientist and Engineers.

(Continued)

*Primary Examiner* — Isam A Alsomiri
*Assistant Examiner* — Amie M Ndure
(74) *Attorney, Agent, or Firm* — Bracewell LLP; Constance G. Rhebergen; Christopher L. Drymalla

(57) ABSTRACT

An array of seismic energy receivers is deployed at fixed locations across the length and width of a land surface area of interest. A land fleet composed of a number of vibratory swept frequency or vibroseis seismic energy sources is deployed at predetermined initial locations within the receiver array. The sources are arranged in groups which at their initial locations are spaced from other groups of the source fleet by an intergroup spacing distance representing a segment of the receiver array. Each of the vibratory sources in a source group is assigned within that group a designated specific length for its energy emissions and a frequency sweep band different from the other sources in the group. The sources in all groups concurrently emit energy at a succession of spaced, assigned locations as they are moved (Continued)

incrementally over their respective intergroup spacings. The responses of subsurface formations to the emissions from the sources are recorded as a blended seismic record by the fixed array of processors and made available for processing.

3 Claims, 3 Drawing Sheets

(56) References Cited

U.S. PATENT DOCUMENTS

| | | | | |
|---|---|---|---|---|
| 9,207,337 | B2* | 12/2015 | Johansen | G01V 1/00 |
| 2006/0278069 | A1* | 12/2006 | Ryan | F41H 13/0043 86/50 |
| 2008/0219094 | A1* | 9/2008 | Barakat | G01V 1/247 367/21 |
| 2009/0323472 | A1* | 12/2009 | Howe | G01V 1/005 367/41 |
| 2010/0085836 | A1* | 4/2010 | Bagaini et al. | 367/41 |
| 2010/0142320 | A1* | 6/2010 | Bagaini | 367/49 |
| 2010/0199772 | A1* | 8/2010 | Bagaini | G01V 1/135 73/648 |
| 2011/0013482 | A1* | 1/2011 | Eick et al. | 367/38 |
| 2011/0096626 | A1 | 4/2011 | Zhu et al. | |
| 2012/0008462 | A1* | 1/2012 | Liu | G01V 1/005 367/56 |
| 2012/0176861 | A1 | 7/2012 | Abma et al. | |
| 2012/0275266 | A1* | 11/2012 | Eick et al. | 367/37 |
| 2012/0290213 | A1* | 11/2012 | Huo et al. | 702/16 |
| 2013/0250723 | A1* | 9/2013 | Dean | G01V 1/005 367/43 |

OTHER PUBLICATIONS

Berkhout, "Changing the mindset in seismic data acquisition" The Leading Edge, Jul. 2008, pp. 924-938.
Beasley et al., "A new look at simultaneous sources" SEG Expanded Abstracts, 1998, pp. 1-3, Society of Exploration Geophysicists.
Huo et al., "Simultaneous Sources Separation via Multi-Directional Vector-Median Filter" SEG Houston International Exposition and Annual Meeting, 2009, pp. 31-35, Society of Exploration Geophysicists.
Howe et al., "Independent Simultaneous Sweeping—A method to increase the productivity of land seismic crews", SEG Las Vegas Annual Meeting, 2008, pp. 2826-2830, Society of Exploration Geophysicists.
Howe et al., "Independent Simultaneous Sweeping in Libya-full scale implementation and new developments", SEG Houston International Exposition and Annual Meeting, 2009, pp. 109-111, Society of Exploration Geophysicists.
Moore et al., "Simultaneous source separation using dithered sources", SEG Las Vegas Annual Meeting, 2008, pp. 2806-2810, Society of Exploration Geophysicists.
Pecholcs et al., "Over 40,000 vibrator points per day with real-time quality control: opportunities and challenges", SEG Denver Annual Meeting, 2010, pp. 111-115, Society of Exploration Geophysicists.
Taner et al., "Estimation and Correction of Near-Surface Time Anomalies" Geophysics, Aug. 1974, pp. 441-463, vol. 39, No. 4, Society of Exploration Geophysicists, Tulsa Oklahoma.
The International Search Report and Written Opinion for related PCT application PCT/US2014/040607, dated Nov. 17, 2014.
Huo et al., "Deblending the Simultaneous Source Blended Data", SPE/DGS Saudi Arabia Section Technical Symposium and Exhibition held in Al-Khobar, Saudi Arabia, 2011, pp. 1-4, Society of Petroleum Engineers.

* cited by examiner

BLENDED LAND SEISMIC DATA ACQUISITION EMPLOYING DISPERSED SOURCE ARRAYS WITH VARIABLE SWEEP LENGTH

BACKGROUND OF THE INVENTION

1. Field of the Invention

The present invention relates to conduct and organization of land seismic surveys where multiple swept frequency vibratory seismic sources are operating in an area of interest.

2. Description of the Related Art

Simultaneous sources or blended acquisition in seismic surveying with swept frequency vibratory or vibroseis sources can significantly improve the source productivity of seismic land crews and reduce the time and expense involved in conducting the surveys. The purpose of blended acquisition is to obtain well-sampled seismic wavefields and improved seismic imaging in a cost effective manner.

One simultaneous source land based acquisition method using swept frequency or vibratory sources was referred to as an independent simultaneous sweeping field acquisition technique, with each land survey crew located in the survey grid operating independently of the others. The apparent intent was to achieve a significant increase in acquisition efficiency coupled with superior image quality. One available service according to the independent simultaneous sweep method is that provided under the trademark ISS® of BP p.l.c. of the U. K.

Crosstalk occurs when there are other sources firing at different times and the energy arrives during the listen time for a vibroseis source. For the Independent Simultaneous Sources (ISS®) acquisition technology, the crosstalk is interference from other sources, and depends both on the time of initiation and distance separation. Often, the crosstalk can be severe due to the elimination of listening time.

Another type of swept frequency surveying has been what is known as blended acquisition. There is, however, a risk in blended acquisition of interference between energy emissions of the vibroseis sources when their initiation times are nearly the same, or what is known as near-simultaneous sweeps. High productivity vibroseis survey methods also present the risk during the survey of interference or crosstalk between signals from different vibroseis sources.

One way of reducing interference in blended acquisition has been based on computer processing of the blended data after acquisition. This has included the randomization of source initiation timings such that the cross-talk noise can be attenuated in different domains (i.e., common-receiver, common-offset and cross-spread) using random noise attenuation and inversion based processing schemes.

Other land acquisition swept frequency blended acquisition systems included ones with the capability of continuously recording very wide receiver super-spreads with time-distance rules for source initiation. These have included both conventional flip-flop and slip-sweep productivity methods. More recent methods have included what are known as Distance-Separated-Simultaneous-Source (DS3) and Distance-Separated-Simultaneous-Slip-Sweep (DS4).

The choice of non-aggressive or aggressive time-distance rules depends on the ability of processing technology to suppress harmonic and crosstalk interference. The lowest risk of crosstalk and harmonic interference is achieved with flip-flop, DS3 or DS4 methods. Flip-flop acquisition is a 'time-only' rule with minimum time separation equal to the vibrator sweep plus recording listen time. DS3 acquisition is a 'distance-only' rule which allows one or more source groups to start simultaneously as long as they are separated by some specified minimum distance such that crosstalk occurs outside the recording listen time. DS4 acquisition is a 'time-and-distance' rule which allows one or more source groups to start simultaneously as long as they are all separated by some specified minimum distance and minimum slip-time.

SUMMARY OF THE INVENTION

Briefly, the present invention provides a new and improved method of land surveying of subsurface formations in an area of interest with emission of seismic energy by a plurality of vibratory source groups. Each vibratory source group comprises a plurality of swept frequency seismic energy sources emitting seismic energy for reception as blended seismic records at a fixed receiver array of seismic energy receivers deployed across a land survey area of interest. According to the method of the present invention the receivers of the array are positioned at fixed locations across the length and width of the area of interest. The vibratory source groups are then positioned in different individual sectors at initial locations in the receiver spread spaced from other vibratory source groups. Frequency sweeps from each seismic energy source in the vibratory source groups are concurrently performed at assigned frequencies in different frequency bandwidths for each of the vibratory source in individual ones of the vibratory source groups. The frequency sweeps for the vibratory sources in each of the individual vibratory source groups are also performed for sweep lengths of different times from the other sources in the same individual vibratory source group. A blended seismic record is formed by the receivers of the response of subsurface formations to the linear frequency sweeps from the concurrently operating vibratory source groups. Due to variable sweep length and the different sweep frequency bandwidth that each vibratory source is emitting, the recorded crosstalk generated by the plurality of vibratory sources and is recorded at the receivers is significantly minimized.

DETAILED DESCRIPTION OF THE PREFERRED EMBODIMENTS

Figure 1:
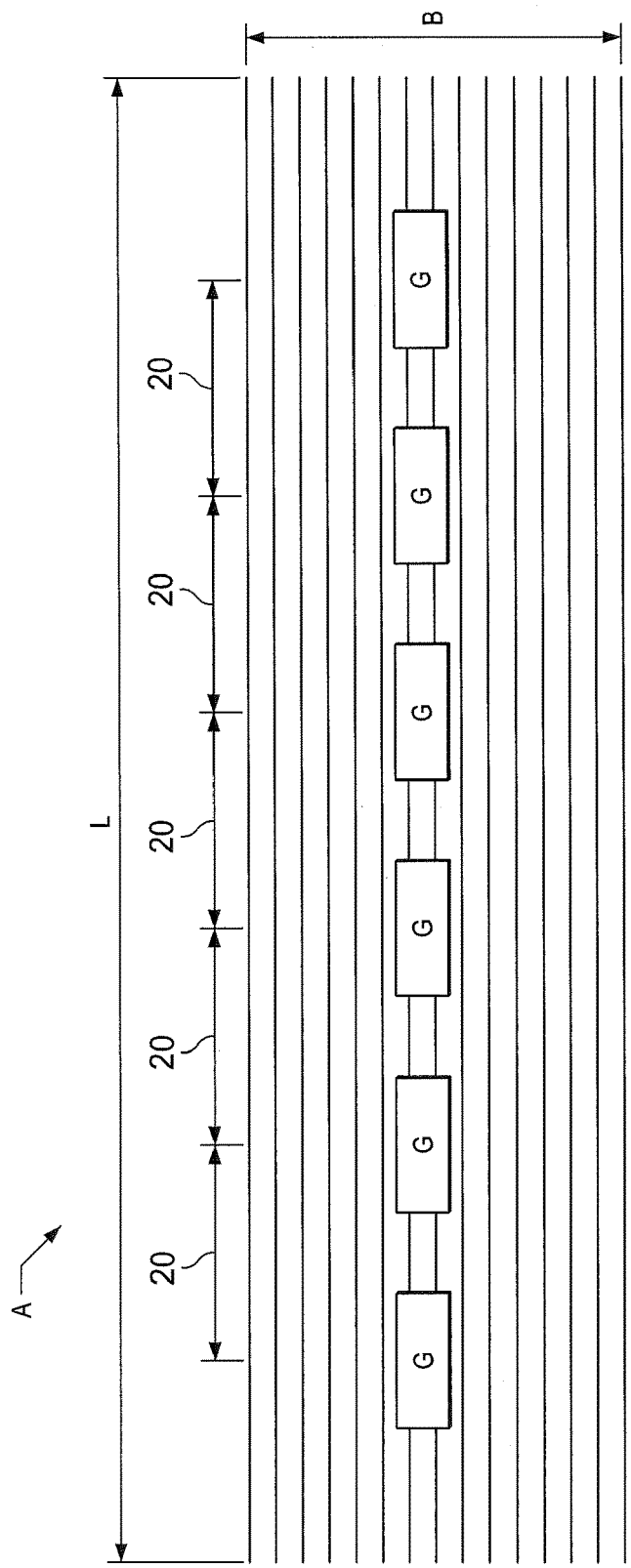
FIG. 1 is a schematic diagram of source and receiver deployment of a swept frequency seismic survey for data acquisition with variable sweep length and frequency bandwidth according to the present invention over a land surface area of interest.

In the drawings, FIG. 1 illustrates deployment of an array or patch A of seismic energy receivers deployed at fixed locations across the length indicated by an arrow L and breadth or width B a land survey area of interest. Individual ones of the seismic energy receivers are shown schematically as receivers R in FIG. 3. The individual receivers R are mounted at fixed locations in the array A. The receivers R may, for example, be Schlumberger Geophone Accelerometers (GAC), although it should be understood that other seismic energy sensors may also be used. An example deployment is set forth in Table 1 below.

TABLE 1

| Spread: | |
|---|---|
| Number of active receiver lines | 28 |
| Number of active stations per receiver line | 2,720 (continuous acquisition entire receiver patch) |
| Number of traces | 76,160 (continuous acquisition entire receiver patch) |
| Distance between source salvos | 12.5 m |
| Distance between receiver lines | 150 m |
| Source station interval | 12.5 m |
| Receiver station interval | 12.5 m |
| Geometry patch size (inline) - length | 33,987.5 m |
| Geometry patch size (cross-line) - breadth | 4,050 m |
| In-line offsets | Full spread |
| Cross-line offset to near trace | Full spread |

Because of the number of receivers, their deployment over the array A is indicated schematically by a number of spaced lines 10 extending across the length L of the array A.

Figure 2:
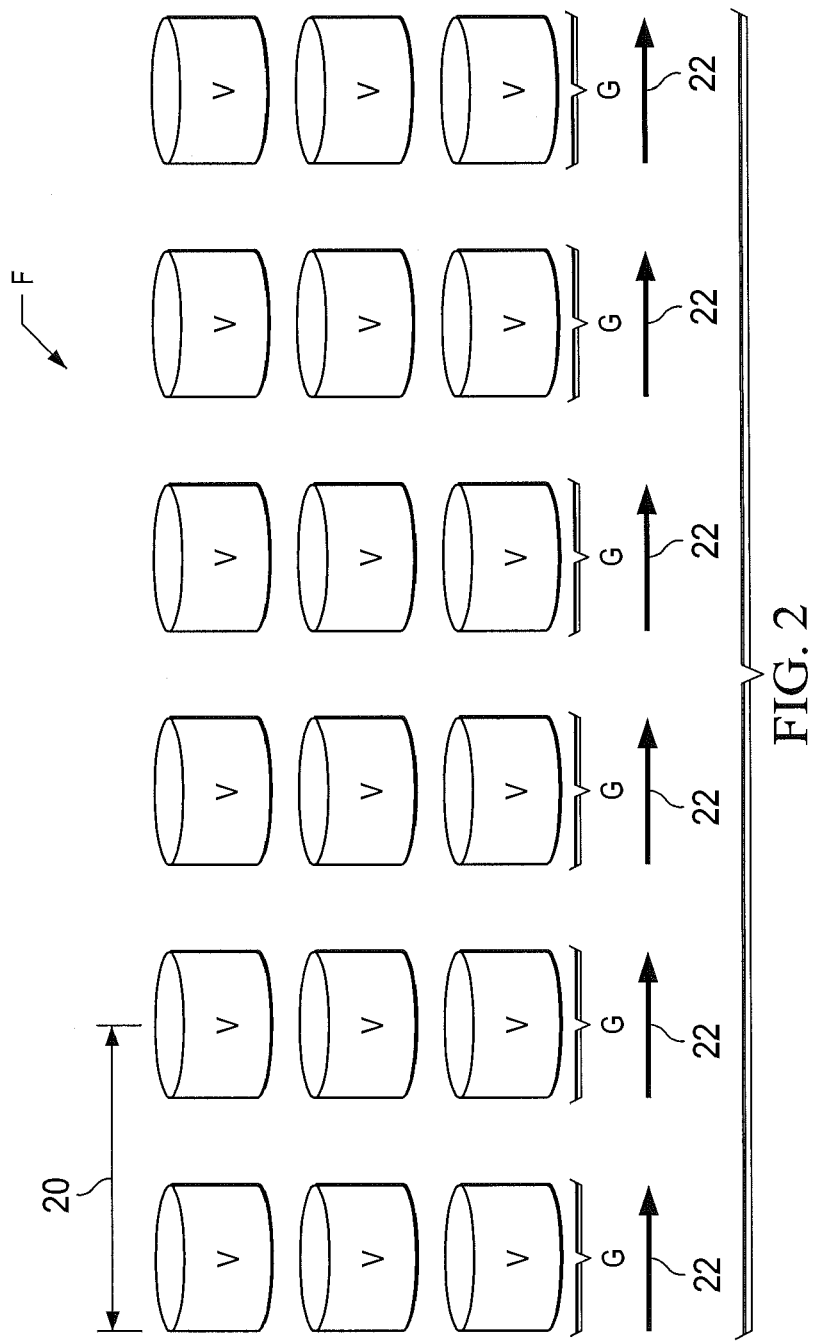
FIG. 2 is an enlarged schematic diagram of the source and receiver deployment of a portion of FIG. 1.

Also illustrated in FIGS. 1 and 2 is a land fleet F (FIG. 2) composed of a suitable number of vehicle transported vibratory swept frequency or vibroseis seismic energy sources V deployed in a number of source groups G. The vibratory seismic energy sources V may, for example be of the type known as a DX-80 land seismic vibrator available from Western Geco. It should be understood that other vibratory seismic sources may also be used.

The vibratory seismic energy sources V of survey groups G are deployed in a dispersed manner over suitable number of predetermined initial locations within the receiver array A, as shown in FIG. 1. As shown in more detail in FIG. 2, a suitable number of swept frequency vibratory sources are deployed in each group G. The number of groups G is based on the length and breadth of the array A over the land surface area above the subsurface formations of interest in the survey. The individual vibratory sources are shown schematically as cylinders in FIG. 2. In the illustrated embodiment, six dispersed survey groups G are shown, with each of the groups G including three vibratory seismic energy sources V. It should be understood that other numbers of sources V and survey groups G may be used, based on the area to be surveyed and the extent of survey coverage required.

Each survey group G is spaced from the next adjacent survey group G of the source fleet by an intergroup spacing distance indicated by an arrow 20 representing a segment of length L of the receiver array A. An example intergroup spacing between the adjacent survey groups G illustrated in FIG. 2 for the receiver deployment set forth in Table 1 would be 3 km. Again, it should be understood that other intergroup spacings could be used, based on the area to be surveyed, the extent of survey coverage required and the amount of crosstalk between the vibratory sources.

Each of the vibratory sources V in a source group G is assigned within that group a designated specific time sweep length for its energy emissions and a frequency sweep band different from the other sources in the group. The frequency sweep bands for different vibratory sources may in some instances partially overlap, but they are in no case allowed to fully overlap or coincide with the frequency sweep bands of the other sources. The frequency sweep lengths for each of the vibratory sources in a group are different from that of other sources in the group. Table 2 below sets forth an example designated specific length for vibratory energy emissions and a frequency sweep band for the illustrated embodiment.

TABLE 2

| VIBRATOR GROUP FREQUENCY - SWEEP LENGTH ASSIGNMENT | | |
|---|---|---|
| VIBRATOR | FREQUENCY | SWEEP LENGTH |
| 1 | 1.5 to 8 Hz | 6 sec |
| 2 | 6.5 to 54 Hz | 12 sec |
| 3 | 50 to 87 Hz | 18 sec |

It should be understood that different frequency sweep bandwidths and different sweep lengths and different numbers of vibratory sources, their vibrator groupings and their respective assigned VP intervals may be used, if desired. The selection of these vibrator parameters for a survey is based on survey area terrain, survey speed, turn-around time and other appropriate survey considerations.

Because of the assignment of different frequencies to the different sources V within the individual groups G, the sources can be located in close proximity to each other, as indicated in FIG. 2, with minimal if any risk of crosstalk or interference between emissions from other sources within the same group.

Preferably, the time sweep length of activations of the vibratory sources V can be set so that longer duration sweep lengths for emissions are performed for the higher assigned bands than for those of the lower frequency bands of assigned within the groups G. If desired, the times of source activation in the various groups can be adjusted based on two-way travel time to the deepest portion of interest in the subsurface formations to further reduce the possibility of cross-talk or interference between swept frequency emissions.

As shown schematically in more detail in FIG. 2 by movement arrows 22, the sources emit energy at the initial emission of seismic energy at the start of the survey and the survey groups of sources move as indicated by arrows 22, and the survey is begun. During the survey, the sources travel along shot lines aligned with the lines of the receivers indicated by lines 10 over the length of the intergroup spacing distance 20. The sources may also travel in directions other than those of alignment with the lines of receivers. For example, the shot lines according to a survey plan may be arranged to be crossing with the lines of receivers as well.

Figure 3:
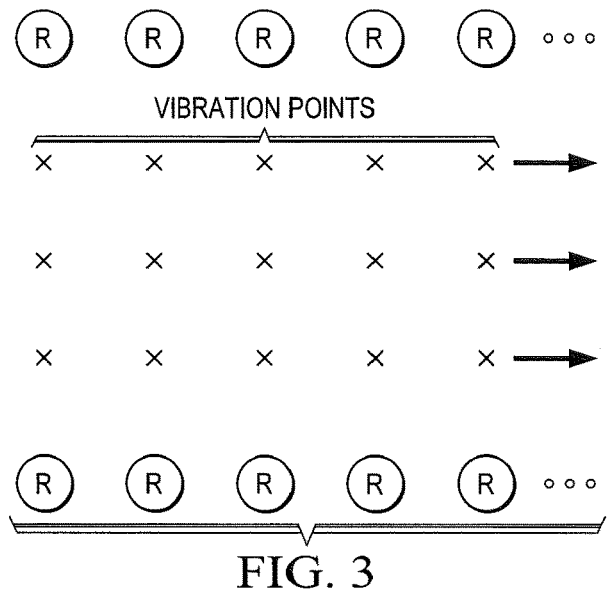
FIG. 3 is an enlarged schematic diagram of a portion of the diagram of FIG. 1 illustrating relative positioning of the vibratory sources with respect to receivers during the course of a land seismic survey with the present invention.

During such travel, the vehicle mounted sources in the groups G move over a successive number of vibrator points or VP's indicated by the symbol x (FIG. 3). As the spaced vibrator points along the line are reached, the sources are activated for a succession of further energy emissions. The VP interval along the shot length is specified as indicated by a survey plan of the type given in Table 1 for example. The sources V in the groups G thus during the survey concurrently emit energy at a succession of spaced, assigned locations as they are moved incrementally over their respective intergroup spacings.

Figure 4:
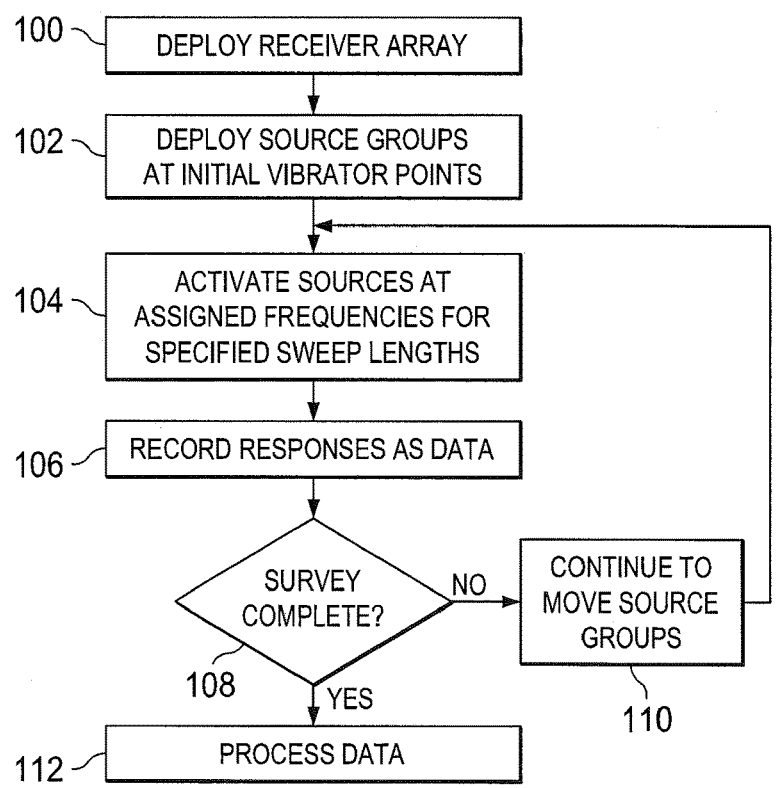
FIG. 4 is a schematic diagram of a process of data acquisition employing different frequency bandwidths vibratory source groups with variable sweep length according to the present invention.

FIG. 4 illustrates schematically the method according to the present invention of land surveying of subsurface formations in an area of interest. As indicated at step 100, the receiver array A is deployed. During step 102, the source groups G are each deployed at their predetermined initial locations or vibrator points (VP's) within the receiver array A, and the vehicles transporting the sources begin movement for the survey.

During step 104, the vibratory sources V in the individual groups G are activated at their respective assigned frequency bands for their respective designated sweep length times of the type set forth above at their initial designated locations. The transport vehicles during step 104 continue moving the sources along their respective line sectors indicated by the intergroup spacing 20 according to the survey plan. The sources are activated as the transport vehicles reach successive vibrator points x during such movement.

If desired, the activation times for different sources V within an individual group G may be slightly different from each other at a vibrator point X by a relatively short slip time, such as 0.1 sec. The slip time can be as short as the relatively short time of OA sec or as long as for example 9 sec if the primary interest is to reduce crosstalk and allow for a reduced crosstalk signal to travel from a vibrator point to the furthest receiver/sensor in the receiver array A. The seismic energy emitted by the sources in the fleet F as they travel across the array A travels through the subsurface formations of interest below the surface array.

As indicated at step 106, the responses of subsurface formations to the emissions from the sources are recorded for a suitable sample interval as blended seismic records by the fixed array A of receivers R and stored to be made available for processing. The responses of subsurface formations to the emissions from the sources are recorded in the conventional manner by seismic recording instrumentation for the fixed array of sensor receivers R and made available for processing. In this way, a blended seismic record is formed at each of the receivers R of the response of subsurface formations to the frequency sweeps from the concurrently operating survey groups G.

As indicated at step 108, if the survey is not completed as a result of the previous source activation, the source groups G as indicated by step 110 continue movement to the next adjacent vibrator point x. Then, as indicated at steps 104 and 106, the vibratory source within each group G are again concurrently activated in the manner described above, and the response of the subsurface formations recorded as blended seismic data. The survey continues as the vehicle mounted sources move according to the survey plan in this manner until the source groups G have reach the end of their respective intergroup spacings. At this time, the recorded data from the receivers R over the array to the concurrently emitted energy from the survey fleet are then available during step 112 to be processed. The processing is performed in a suitable conventional seismic data processing system. The acquired data is processed by correlation of the recorded signals with the corresponding source sweep signals and is then deblended by applying appropriate deblending technologies and workflows. The results of the correlation and deblending processes are seismic trace data which can then be subject to further processing of the conventional types used in seismic analysis.

As noted, the sources in the groups G are assigned different frequency bands and different sweep lengths for their energy emissions. Crosstalk in the data because of source energy emission frequency overlap is reduced. Further, the recorded deblended seismic data responses of the subsurface formation is susceptible to effective accurate deblending. In addition, the data acquisition time is reduced.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the process of the same, requires the claimed matter in the following claims; such structures shall be covered within the scope of the invention.

It should be noted and understood that there can be improvements and modifications made of the present invention described in detail above without departing from the spirit or scope of the invention.

What is claimed is:

1. A method of surveying of subsurface formations in a survey area of interest with emission of seismic energy by a plurality of vibratory source groups at a succession of vibrator source points along a shot line in the area of interest, each vibratory source group comprising a plurality of swept frequency seismic energy sources emitting seismic energy for reception as blended seismic records at a fixed receiver array of seismic energy receivers deployed across the survey area of interest, each vibratory source group being spaced along the shot line from other vibratory source groups of the plurality of vibratory source groups by an intergroup spacing, the method comprising the method the steps of:

(a) locating the receivers of the array at fixed positions across the length and width of the survey area of interest spaced from each other by a receiver station interval;

(b) locating the vibratory source groups at separate initial vibrator source point locations along the shot line over the receiver spread, the initial vibrator source point locations being spaced from one another by the intergroup spacing distance along the shot line;

(c) performing, by each vibratory source group of the plurality of vibratory source groups, a frequency sweep at the initial vibrator source point location of the vibratory source group, the frequency sweep comprising each of the swept frequency seismic energy sources of the vibratory source group conducting a seismic sweep emission having the following:

a start time that is different from the start times of each of the seismic sweep emissions conducted by the other swept frequency seismic energy sources of the vibratory source group;

a frequency sweep bandwidth that is different from the frequency sweep bandwidth of each of the seismic sweep emissions conducted by the other swept frequency seismic energy sources of the vibratory source group; and a frequency sweep length that is different from the frequency sweep length of the seismic sweep emissions conducted by the other swept frequency seismic energy sources of the vibratory source group;

(d) moving the vibratory source groups of sources across the receiver array to successive ones of the assigned vibrator source points spaced along the shot line by the receiver station interval over the length of the intergroup spacing in the area of interest;

(e) repeating the step of performing frequency sweeps according to steps (c) at the successive ones of the assigned vibrator source points spaced along the shot line by the receiver station interval with the plurality of vibratory source groups until the vibratory source groups reach the end of their respective intergroup spacing; and (f) forming a blended seismic record by recording at the receivers of the fixed array the response during sample intervals of subsurface formations to the energy emitted in the frequency sweeps from the concurrently operating vibratory source groups at the successive ones of the assigned vibrator source points over the length of the intergroup spacing.

2. A method of surveying of subsurface formations in a survey area of interest with emission of seismic energy by a plurality of vibratory source groups at a succession of vibrator source points along a shot line in the survey area of interest, each vibratory source group comprising a plurality of swept frequency seismic energy sources, each swept frequency seismic energy source in a vibratory source group being assigned a designated specific time sweep length for its energy emissions and a frequency sweep band different from each of the other swept frequency seismic sources in the vibratory source group, the swept frequency seismic energy sources of the a plurality of vibratory source groups emitting seismic energy for reception as blended seismic records at a fixed receiver array of seismic energy receivers deployed across the survey area of interest, each vibratory source group being spaced along the shot line from other vibratory source groups of the plurality of vibratory source groups by an intergroup spacing, the method comprising the method the steps of:

(a) locating the receivers of the array at fixed positions across the length and width of the survey area of interest spaced from each other by a receiver station interval;

(b) locating the vibratory source groups at separate initial vibrator source locations along the shot line over the receiver spread, the initial vibrator source point locations being spaced from one another by the intergroup spacing distance along the shot line;

(c) performing, by each vibratory source group of the plurality of vibratory source groups, a frequency sweep at the initial vibrator source point location of the vibratory source group, the frequency sweep comprising each of the swept frequency seismic energy sources of the vibratory source group conducting a seismic sweep emission having the following:
    a start time that is different from the start times of each of the seismic sweep emissions conducted by the other swept frequency seismic energy sources of the vibratory source group;
    a frequency sweep bandwidth that is different from the frequency sweep bandwidth of each of the seismic sweep emissions conducted by the other swept frequency seismic energy sources of the vibratory source group; and
    a frequency sweep length that is different from the frequency sweep length of the seismic sweep emissions conducted by the other swept frequency seismic energy sources of the vibratory source group;

(d) moving the vibratory source groups of sources across the receiver array to successive ones of the assigned vibrator source points spaced along the shot line by the receiver station interval over the length of the intergroup spacing in the area of interest;

(e) repeating the step of performing frequency sweeps according to steps (c) at the successive ones of the assigned vibrator source points spaced along the shot line by the receiver station interval with the plurality of vibratory source groups until the vibratory source groups reach the end of their respective intergroup spacing; and (f) forming a blended seismic record by recording at the receivers of the fixed array the response during sample intervals of subsurface formations to the energy emitted in the frequency sweeps from the concurrently operating vibratory source groups at the successive ones of the assigned vibrator source points over the length of the intergroup spacing.

3. A method of surveying a subsurface formation, the method comprising:
    positioning an array of seismic energy receivers across a length and width of an area of interest;
    positioning a plurality of vibratory source groups, each vibratory source group of the plurality of vibratory source groups comprising a plurality of swept frequency seismic energy sources, the positioning comprising positioning each of the plurality of vibratory source groups at an initial source position, the plurality of vibratory source groups being spaced apart from one another by an intergroup spacing, and the initial source position being a first position in a sequence of source positions along a shot line in the area of interest that are separated from one another by a receiver station interval;
    for each source position of the sequence of source positions along the shot line in the area of interest:
        for each of the plurality of vibratory source groups:
            performing a frequency sweep comprising each of the swept frequency seismic energy sources of the vibratory source group conducting a seismic sweep emission having the following:
                a start time that is different from the start times of each of the seismic sweep emissions conducted by the other swept frequency seismic energy sources of the vibratory source group;
                a frequency sweep bandwidth that is different from the frequency sweep bandwidth of each of the seismic sweep emissions conducted by the other swept frequency seismic energy sources of the vibratory source group; and
                a frequency sweep length that is different from the frequency sweep length of the seismic sweep emissions conducted by the other swept frequency seismic energy sources of the vibratory source group; and
            moving, upon completing the frequency sweep, the vibratory source group to a next source position of the sequence of source positions along the shot line in the area of interest;
    recording, by the array of seismic energy receivers, seismic data responsive to the seismic sweep emissions by the swept frequency seismic energy sources of the vibratory source groups; and
    generating, using seismic data, a blended seismic record.

* * * * *

UNITED STATES PATENT AND TRADEMARK OFFICE
CERTIFICATE OF CORRECTION

PATENT NO. : 10,371,839 B2
APPLICATION NO. : 13/910274
DATED : August 6, 2019
INVENTOR(S) : Constantinos Tsingas Page 1 of 1

It is certified that error appears in the above-identified patent and that said Letters Patent is hereby corrected as shown below:

In the Claims

Column 6, Line 65 Claim 1 should read:
-- according to step (c) at the successive ones of the --

Column 8, Line 2 Claim 2 should read:
-- according to step (c) at the successive ones of the --

Signed and Sealed this
Twenty-first Day of April, 2020

Andrei Iancu
*Director of the United States Patent and Trademark Office*